United States Patent Office 2,829,950
Patented Apr. 8, 1958

2,829,950

PREPARATION OF SODIUM HYDRIDE FROM SODIUM AMALGAM AND HYDROGEN

George L. Cunningham, Cleveland, Ohio, assignor to Callery Chemical Company, Pittsburgh, Pa., a corporation of Pennsylvania No Drawing. Application December 1, 1954
Serial No. 472,531

5 Claims. (Cl. 23—204)

This invention relates to the preparation of sodium hydride and more particularly to its preparation by the hydrogenation of a concentrated sodium amalgam. Further reaction with trimethyl borate converts the sodium hydride to the soluble sodium trimethoxyborohydride, $NaBH(OCH_3)_3$, which is a valuable intermediate in the preparation of other boron containing compounds.

Sodium hydride is made commercially by the reaction of gaseous hydrogen on molten sodium metal. There is no great difficulty in forming sodium hydride by this process nor is there any difficulty in converting the sodium hydride into sodium trimethoxyborohydride, sodium borohydride or other metallic hydrides by suitable reactions. The one big difficulty is the problem of producing metallic sodium in an efficient and economical manner. Commercial metallic sodium is produced almost exclusively by the electrolysis of molten sodium chloride containing calcium chloride and other chlorides. A small amount of sodium is made by the electrolysis of molten sodium hydroxide. These processes are expensive and destructive to the apparatus due to the high temperatures involved. In both the molten sodium chloride and molten sodium hydroxide electrolytic cells, difficulties are encountered in separating the anodic and cathodic products. There are also other commercial difficulties in these processes which are well recognized in the art but for which there have been no satisfactory solutions.

Sodium amalgam is made commercially by the electrolysis of substantially saturated aqueous solutions of sodium chloride at about 90° C. using graphite or platinum as the anode and mercury as a cathode. These sodium amalgam cells have now reached a high state of development. The sodium chloride in the brine need not be especially purified and over 95% of the sodium chloride in the brine is converted into sodium amalgam and chlorine. The sodium amalgam made in these cells contains about 0.1% sodium by weight. These electrolytic cells can be operated to produce amalgam containing about 1.0% sodium by weight but with slightly lower efficiencies. If an attempt is made to operate these cells to produce higher concentrations of sodium, the efficiency is materially reduced and there is a tendency for the amalgam to solidify.

It is an object of this invention to provide a new and useful method whereby dilute sodium amalgam produced electrolytically can be concentrated and hydrogenated to convert it into sodium hydride efficiently and economically.

Other objects will become apparent from the following specification and appended claims.

This new and improved method for producing sodium hydride will be more fully described hereinafter and the novelty thereof will be particularly pointed out and distinctly claimed.

This invention is based upon the discovery that the dilute sodium amalgam (containing about 0.8% sodium by weight) resulting from the electrolysis of an aqueous solution of suitable sodium salt in the presence of a mercury cathode can be concentrated by adding it to a pool of amalgam containing from 5% to 10% sodium by weight and heating the mixture under reduced pressure to a temperature sufficiently high to volatilize the mercury. The concentrated amalgam in the pool which is distilling can be treated with hydrogen gas to form sodium hydride or part of the pool of amalgam can be removed from the still and treated with hydrogen to form the sodium hydride.

It is important to add the dilute sodium amalgam to a more concentrated amalgam in order to prevent the amalgam from solidifying. The phase diagram of the sodium and mercury system shows that at about 5% sodium by weight the amalgam has a maximum melting point of about 353° C. At this point a solid having the composition $NaHg_2$ is the solid phase. A 10% sodium amalgam melts at about 226° C. When this pool of mercury containing about 10% sodium is heated under reduced pressure no solid phase separates and the distillation of the excess mercury will proceed without plugging up the still.

When the concentration of an amalgam is given on a weight basis the values may seem quite low although the mol fraction value is high. For example, an amalgam containing 10% sodium by weight contains actually 49.2 mol percent of sodium. The 10% sodium content of the amalgam does not represent a limiting value. It can be greater or less without seriously affecting the process. By removing the excess mercury under reduced pressure, the sodium amalgam can be concentrated so that it contains between 5% and 50% sodium by weight.

In one experiment a 40% sodium amalgam containing 30.5 g. of mercury and 20.3 g. of sodium was hydrogenated for 7.5 hours at 250°–300° C. by bubbling hydrogen through the amalgam at atmospheric pressure. After the system had cooled to room temperature, 100 ml. of redistilled trimethyl borate was added to the resulting product and refluxed for 7.5 hours. The excess trimethyl borate was completely removed by distillation under vacuum and the residue was covered with dioxane freshly distilled over sodium. This mixture was heated at 80° C. for thirty minutes. The mixture was transferred to a separatory funnel, the amalgam was drained off and the slurry of gray solid was filtered by suction. This gray solid was extracted in a Soxhlet apparatus with dioxane for five hours. When the solvent was evaporated, a white solid remained which upon analysis was found to contain about 65% sodium trimethoxyborohydride $$NaBH(OCH_3)_3$$

Having thus described this invention fully and completely it should be understood that this invention may be practiced otherwise than as specifically described.

What I desire to claim and secure by United States patent is:

1. A method of preparing sodium hydride which comprise concentrating a dilute sodium amalgam and reacting said amalgam with hydrogen.

2. A method according to claim 1 in which the dilute sodium amalgam is concentrated by adding it to a pool of amalgam containing 5% to 10% sodium by weight and heating the amalgam under reduced pressure to volatilize the excess mercury.

3. A method according to claim 1 in which the sodium content of the concentrated amalgam is about 5% to about 50% by weight.

4. A method according to claim 1 in which the hydrogenation is carried out at a temperature of 250° C. to 300° C.

5. A method according to claim 1 in which hydrogen gas is bubbled through a concentrated sodium amalgam containing 40% sodium by weight for about 7 hours at atmospheric pressure at a temperature of 250°–300° C.

No references cited.